United States Patent [19]

van Herk et al.

[11] 4,163,265

[45] Jul. 31, 1979

[54] MAGNETIC DISC MEMORY AND MAGNETIC DISC FOR THIS MEMORY

[75] Inventors: Alfred van Herk, Eindhoven; Duco W. J. Pulle, Valkenswaard, both of Netherlands

[73] Assignee: U.S. Philips Corporation, New York, N.Y.

[21] Appl. No.: 882,273

[22] Filed: Feb. 28, 1978

[30] Foreign Application Priority Data

Mar. 10, 1977 [NL] Netherlands .................. 7702570

[51] Int. Cl.² ................ G11B 21/10; G11B 5/12
[52] U.S. Cl. .................................. 360/77; 360/78; 360/135
[58] Field of Search ............... 360/77, 75, 78, 135, 360/109; 318/685, 653, 647

[56] References Cited

U.S. PATENT DOCUMENTS

| 3,534,344 | 10/1970 | Santana | 360/77 |
| 3,812,533 | 5/1974 | Kimura et al. | 360/77 |

OTHER PUBLICATIONS

IBM Tech. Disc. Bull., Bush et al., Magnetic Head Position Sensing, vol. 16, No. 5, Oct. 1973, pp. 1379-1380.
IBM Tech. Disc. Bull., R. K. Oswald, Continuous Position Error Signal for Access Control System, vol. 19, No. 2, Jul. 1976, pp. 679-680.

*Primary Examiner*—Alfred H. Eddleman
*Attorney, Agent, or Firm*—Thomas A. Briody; Edward J. Connors, Jr.; James J. Cannon, Jr.

[57] ABSTRACT

A magnetic disc memory having a device for positioning a magnetic head on a track. A disc is sub-divided into sectors comprising groups of data tracks and, alternating therewith, sectors having groups of servo tracks which define the data tracks which are staggered over one half track pitch with respect thereto. Each servo track includes magnetization changes (reference transitions) for reference purposes. Magnetization changes for position detection purposes (measuring transitions) are present in the servo sectors, stepwise from track to track per group of servo tracks. Said stepwise magnetization changes are of alternating polarity from track to track. An additional transition is provided every other servo track in the vicinity of the reference transitions. A stepwise organization of the magnetization changes in two longitudinal directions of the servo tracks enables the number of tracks per group to be substantially doubled.

10 Claims, 13 Drawing Figures

| MPipos | MPineg | SPN | dec+ | dec- | ADDR bin + | bin - | ADDRC(=SPN) dec | bin |
|---|---|---|---|---|---|---|---|---|
| 10 | 0 | 0 | 1 | 0 | 0 0 0 1 | 0 0 0 0 | 0 | 0 0 0 0 |
| 1 | 0 | 0 | 1 | 2 | 0 0 0 1 | 0 0 1 0 | 1 | 0 0 0 1 |
| 1 | 10 | 1 | 1 | 10 | | | 1 | 0 0 0 1 |
| 1 | 2 | 1 | 2 | 0 | | | 15 | 1 1 1 1 |
| 10 | 2 | 2 | 2 | 3 | | | 14 | 1 1 1 0 |
| 3 | 2 | 2 | 2 | 10 | | | 15 | 1 1 1 1 |
| 3 | 10 | 3 | 3 | 2 | | | 2 | 0 0 1 0 |
| 3 | 4 | 3 | 3 | 4 | | | 3 | 0 0 1 1 |
| 10 | 4 | 4 | 3 | 10 | | | 3 | 0 0 1 1 |
| 5 | 4 | 4 | 4 | 3 | | | 13 | 1 1 0 1 |
| 5 | 10 | 5 | 4 | 5 | | | 12 | 1 1 0 0 |
| 5 | 6 | 5 | 4 | 10 | | | 13 | 1 1 0 1 |
| 10 | 6 | 6 | 5 | 4 | | | 4 | 0 1 0 0 |
| 7 | 6 | 6 | 5 | 6 | | | 5 | 0 1 0 1 |
| 7 | 10 | 7 | 5 | 10 | | | 5 | 0 1 0 1 |
| 7 | 8 | 7 | 6 | 5 | | | 11 | 1 0 1 0 |
| 10 | 8 | 8 | 6 | 7 | | | 10 | 1 0 1 0 |
| 9 | 8 | 8 | 6 | 10 | | | 11 | 1 0 1 1 |
| 9 | 10 | 9 | 7 | 6 | | | 6 | 0 1 1 0 |
| 9 | 7 | 9 | 7 | 8 | | | 7 | 0 1 1 1 |
| 10 | 7 | 10 | 7 | 10 | | | 7 | 0 1 1 1 |
| 6 | 7 | 10 | 9 | 7 | | | 9 | 1 0 0 0 |
| 6 | 10 | 11 | 9 | 8 | | | 8 | 1 0 0 0 |
| 6 | 5 | 11 | 9 | 10 | | | 9 | 1 0 0 1 |
| 10 | 5 | 12 | 10 | 0 | | | 0 | 0 0 0 0 |
| 4 | 5 | 12 | 10 | 2 | | | 2 | 0 0 1 0 |
| 4 | 10 | 13 | 10 | 3 | | | 14 | 1 1 1 0 |
| 4 | 3 | 13 | 10 | 4 | | | 4 | 0 1 0 0 |
| 10 | 3 | 14 | 10 | 5 | | | 12 | 1 1 0 0 |
| 2 | 3 | 14 | 10 | 6 | | | 6 | 0 1 1 0 |
| 2 | 10 | 15 | 10 | 7 | | | 10 | 1 0 1 0 |
| 2 | 0 | 15 | 10 | 8 | 1 0 1 0 | 1 0 0 0 | 8 | 1 0 0 0 | a          b

MAGNETIC DISC MEMORY AND MAGNETIC DISC FOR THIS MEMORY

BACKGROUND OF THE INVENTION

1. Field of The Invention

The invention relates to a magnetic disc memory, comprising a device for positioning a magnetic head on a track, a disc being sub-divided into sectors comprising groups of data tracks and sectors comprising groups of servo tracks in an alternating manner, said servo tracks defining the data tracks which are staggered over one half track pitch with respect thereto, each servo track containing magnetization changes (so-called reference transitions) for reference purposes, the servo sectors comprising, per group of servo tracks, step-wise magnetization changes (so-termed measuring transitions) from track to track for position detection purposes, said magnetization changes generating signals in the magnetic head which, when applied to a detection circuit and an amplitude control circuit, supply information with regard to a track number reached in a group and which provide positioning of the magnetic head between two adjacent servo tracks.

2. Description of The Prior Art

A device of this kind, including an associated magnetic disc, is known from U.S. Pat. No. 3,812,533 which extensively describes an embodiment of a disc memory in which the servo signals are recorded in some 130 sectors on all disc sides. The tracks are sub-divided into groups of eight tracks. The positioning onto a track is effected by means of two separate systems: coarse positioning is effected in this embodiment by means of a coarse-control servo loop which includes an optical position transducer, while fine positioning is realized by means of said servo signals. This invention concerns fine positioning, which is why special attention is paid to fine positioning hereinafter.

After a carriage supporting the magnetic head or heads has been positioned on a given group by coarse control, positioning is taken over by fine control; the following then occurs: the reference transitions of one or two neighboring servo tracks in the group supply a reference pulse after detection. The measuring transition (transitions) of this servo track or those of nighboring servo tracks generates (generate) a measuring pulse (measuring pulses) in the read-write head. Measurement of the time expiring between the reference pulse and the meaasuring pulse (pulses) indicates on which track or in the vicinity of which track the head is situated. Determination of the difference between the amplitudes of the two measuring pulses (if one pulse is lacking, its amplitude is assumed to be zero) accurately indicates the relative position with respect to the two associated servo tracks. Both data are used for position control. The measuring transitions, and hence the measuring pulses derived therefrom, all have the same sign in the known device and form a regular pattern. As a result, a low-frequency crosstalk signal arises in the magnetic head, said crosstalk signal originating from tracks which are situated further away. The measuring pulses are superposed thereon, which is liable to cause incorrect positioning. This constitutes a serious drawback of the known device.

A further drawback of the known device is that the measuring transitions of like sign must be situated at a suitable distance from each other in successive servo tracks in order to enable discrimination in a comparison circuit which forms part of the control circuit. A further minimum value for the measuring transition interval in successive tracks is imposed by the time required for performing some electronic switching functions, because the amplitudes of two successive measuring pulses, originating from the signal of the magnetic head situated somewhere between two servo tracks and having the same sign, must be determined by different peak detectors. These distance requirements are the reason that the length of the servo sectors in the tracks is subject to a strict minimum. A practical figure in this respect is a time interval of 1 $\mu s$ between successive measuring transitions, which means a distance of 50 $\mu m$ for a rotary speed of 50 m/s. If extension of the groups of tracks were contemplated, this would imply a substantial loss of data storage capacity. However, extension of the number of tracks per group is attractive (for example, from 8 tracks to 16 or 32 tracks per group), because the requirements to be imposed as regards coarse control may be substantially less severe, or because even simpler and cheaper methods of coarse control (for example, a mechanical or magnetic system instead of an optical system) may then be adopted.

SUMMARY OF THE INVENTION

The present invention has for its object to eliminate the described drawbacks; to this end, the magnetic disc memory in accordance with the invention is characterized in that the step-wise measuring transitions are formed by magnetization changes of alternating sign, an additional transition being provided every other servo track in the vicinity of the reference transitions. Said magnetization changes of unlike sign generate measuring pulses which are alternately positive and negative. In this situation, there is no low-frequency crosstalk signals, so that more accurate positioning is possible. Moreover, the measuring transitions may be situated nearer to each other, because from an electronic point of view it is not problematic, due to the possibility of using two separate circuits, to determine the relevant amplitudes of measuring pulses which are situated near each other but which have a different sign. In practice, favourable results have already been achieved with measuring transitions situated a factor of two nearer to each other: 0.5 $\mu s$ instead of the said 1 $\mu s$; for a speed of 40 m/s, this implies a distance of 20 $\mu m$. The space thus created may be used either as data storage space or for extending the number of tracks per group. In view of the changing of the sign of he magnetization of the measuring transition, the additional magnetization change is a necessary consequence of the fact that the signs of the magnetization changes must always alternate in the longitudinal direction of a servo-track and the fact that there must always be an equal number of changes of each sign in order to prevent crosstalk. In practice, this additional transition is situated near the reference transitions in order to prevent mix-ups with the measuring transitions.

It is to be noted that U.S. Pat. No. 3,534,344 already discloses (FIG. 2) servo tracks with staggered changing of magnetization transitions. However, these magnetization transitions are present in a two by two arrangement, because each track has a given magnetization in which a number of regions of opposed magnetization are provided. This requires two transitions per region, so that additional space is required. This would not be permissible in the disc memory in accordance with the present invention. Moreover, it is to be noted that said U.S. Patent does not further relate to the present invention, because U.S. Pat. No. 3,534,344 does not at all concern a subdivision of tracks on a disc into data sectors and servo sectors. It only concerns servo sectors which are provided on a separate disc side, and no use is made of reference transitions. This has it typical drawbacks, which have already been elaborated in U.S. Pat. No. 3,812,533 and for which this U.S. Patent, as well as the present application, constitutes a substantial improvement.

It has already been stated that the space saved in the servo tracks by the solution in accordance with the invention can be utilized to increase the number of tracks per group. In accordance with the further aspect of the invention, the extension of the number of tracks can also be realized in a different manner. To this end, the magnetic disc memory is characterized in that in a group of servo tracks the measuring transitions are provided stepwise from track to track in the one longitudinal direction in a first part of the group and in the other longitudinal direction of the tracks in a second part of the group, the measuring transitions within the group which are situated at substantially the same distance from the reference transition being of unlike sign, so that the number of tracks within the group is substantially doubled, while the length of the servo tracks remains the same. When use is made of this organization of the measuring transitions in the servo tracks, the number of tracks within a group is substantially doubled for the same space within the servo tracks (that is, the same length of the servo tracks). Considering the previous space saving by a factor of two plus the latter factor of two, this means a saving by a factor of four in the length of the servo tracks. In other words, at substantially the same length of the servo tracks, the number of tracks accommodated per group can be increased by a factor of four, for example, from 8 tracks to 32 tracks per group.

A preferred embodiment of the magnetic disc memory incorporating the described group extension is characterized in that the detection circuit comprises a measuring pulse detection device in which not only the position measuring pulses are derived from the measuring transitions, but also the polarity of the measuring pulses is determined; a track number code being derived from the position measuring pulses in a position detection device under the control of said polarity of the measuring pulses. Thus, the presence of the measuring pulse polarity signals is utilized to achieve unambiguous and simple track number coding. In magnetic disc memories, changes often occur in the measuring signals which are caused by variations in the floating height of the head and/or in the thickness of the magnetic layer on the disc. These abrupt variations can be eliminated by utilizing the construction of a magnetic disc memory in accordance with the invention. To this end, a preferred embodiment of the magnetic disc memory in accordance with the invention is characterized in that in the amplitude control circuit, after detection of the positive ($\hat{U}1$) and negative ($\hat{U}2$) peak voltage of the measuring pulses generated by the measuring transitions, the difference voltage ($\hat{U}- = \hat{U}1 - \hat{U}2$) is inverted in an inverter, a switch being used to apply the voltage ($\hat{U}-$) and the inverted voltage ($-\hat{U}-$) respectively, of every other track to a dividing device to which the sum voltage ($\hat{U}+ = \hat{U}1 + \hat{U}2$) is also applied, the difference voltage ($\hat{U}-$ or $-\hat{U}-$) being divided by the sum voltage ($\hat{U}+$) in said dividing device in order to eliminate abrupt variations in the amplitudes of the measuring pulses. In a further preferred embodiment of the memory in accordance with the invention, the nature of the signals generated in the magnetic disc memory enables, in an adding amplifier having an input which receives a track number difference signal which originates from the detection circuit and which has been formed in a digital-to-analog converter thereof, and also having a further input which receives a peak voltage difference signal originating from the control circuit, the summation of said two signals to produce a control signal (Upos) which is linear over a group of tracks. Such a linear control signal enables simple, proportional fine-positioning within a group.

In order to derive maximum benefit from the proposals in accordance with the invention, a further advantageous aspect to the invention is that the servo tracks are provided with at least two, and preferably three, reference transitions, so that the reference signal generated by means of the magnetic head consists of at least two pulses or at least two pulses of like sign, respectively. It is thus ensured that the low-frequency content of the reference pulses is also minimum, so that the crosstalk from adjacent tracks is minimum. When two of these reference pulses are of like sign, the discrimination between these reference pulses and the measuring pulses is simplified. In order to ensure that no crosstalk can arise in the case of the three reference transitions, a second additional transition is provided in the servo tracks already comprising an additional transition. The additional transition is preferably situated in the vicinity of the reference transitions, between these reference transitions and the measuring transitions. In the case of a second additional transition, the additional transitions are preferably situated on either side in the vicinity of the reference transitions.

The magnetic disc memory and the magnetic disc in accordance with the invention will be described in detail hereinafter with reference to the figures. It is to be noted that this description is merely a sampling from the multitude of possibilities and that the invention is by no way restricted to these examples.

BRIEF DESCRIPTION OF THE DRAWINGS

FIG. 8a through d and 9a and b show further signal diagrams associated with the device shown in FIG. 4.

DESCRIPTION OF THE PREFERRED EMBODIMENT

Figure 1:
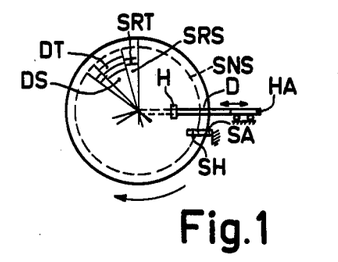
FIG. 1 shows a magnetic disc with head arrangement.

FIG. 1 diagrammatically shows a magnetic disc with an associated magnetic head arrangement. The disc D is sub-divided into data sectors DS in which data tracks DT are situated, and servo sectors SRS in which servo tracks SRT are situated. The data tracks DT are staggered over one half track pitch (that is, the distance between the center lines of two adjacent tracks) with respect to the servo tracks SRT. On the outer edge of the disc D there is provided a synchronization track SNS. In this embodiment, the magnetic head arrangement consists of a read/write head H which is mounted on a movable arm HA, and a synchronization track magnetic head SH which is mounted on a fixed arm SA and which is arranged over the synchronization track SNS.

Figure 2:
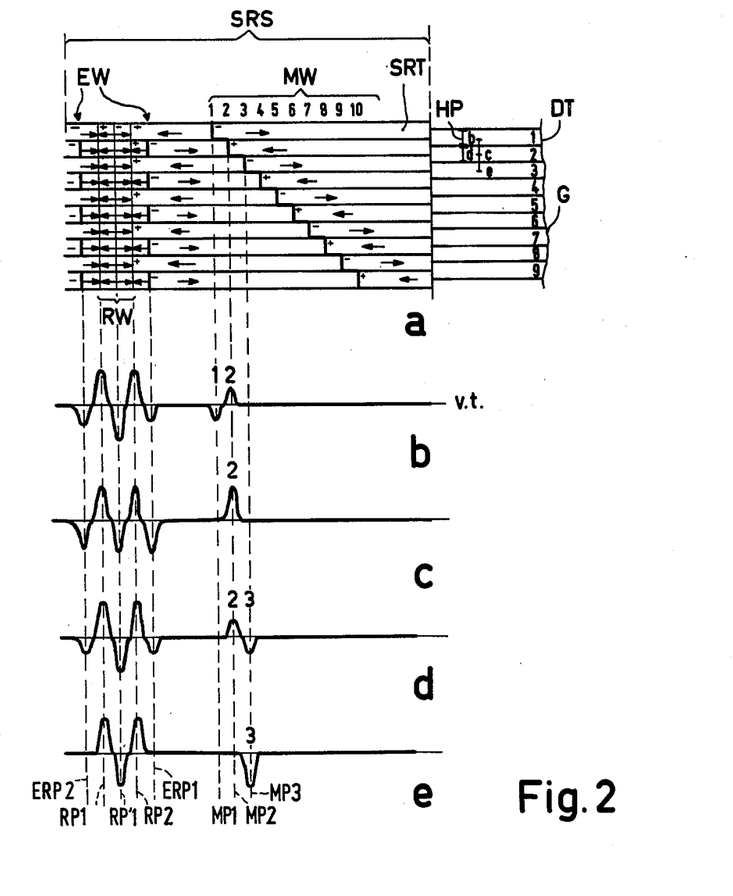
FIG. 2, consisting of a through e, shows a magnetization pattern of a servo sector segment with associated signal diagrams.

FIG. 2 shows the magnetization pattern with the associated read signals of a servo sector segment as proposed in accordance with the invention. FIG. 2a shows a group G of data tracks DT with servo tracks SRT of a sector SRS. The servo sector SRS consists of three pieces: RW, which indicates the part for the magnetization changes for the reference transitions, EW which denotes the parts for the additional magnetization changes which are in this case provided on either side in the vicinity of reference transitions, and MW which denotes the part for the magnetization changes for the measuring transitions. The measuring transitions are numbered 1, 2, ... 10 and refer to the track numbers of the group G. This group comprises an equal number but one, so in this example 10 servo tracks SRT and 9 data tracks DT which, as has already been stated, are staggered over one half track pitch with respect to the servo tracks SRT. Furthermore, the FIG. 2a also shows a number of feasible magnetic head positions: the magnetic head H (FIG. 1) passes through the positions HPb, HPc, HPd and HPe. FIG. 2a clearly shows how the magnetization changes of the measuring transitions MW are of alternating sign in a stepwise manner from track to track in accordance with the invention: see the arrows which indicate the direction of the magnetization and the + and − symbols. For the reference transitions RW, three magnetization changes are indicated to the left of each servo track in this case. Finally, FIG. 2 illustrates how the additional magnetization changes EW, provided every other servo track on either side of the reference transitions, ensure that the signs of the magnetization changes always alternate in the longitudinal direction of each track and that an equally large number of changes of each sign are present in each servo track. The successive FIGS. 2b through 2e show which read signals are generated by magnetic head H in the various positions HPb through HPe during rotation of the disc. On the vertical lines extending through these figures and FIG. 2a, the following signals can be successively read in these figures; RP1, RP2: two reference pulses of like sign; RP1': the third reference pulse, but opposed to the reference pulses RP1 and RP2; ERP1 and ERP2: the additional pulses originating from the additional transitions; MP1, MP2 and MP3: the measuring pulses from the various measuring transitions 1, 2, 3. The horizontal axis is a distance axis have a scale v.t (the velocity of the disc x time). These FIGS. 2b–2c clearly show that no low-frequency components of the signals are present. These low-frequency components cancel each other per servo track. If instead of three reference transitions per servo track only two such transitions are used, this is still applicable. The one additional transition then required will be alternately present per track, staggered over one track in comparison with FIG. 2a. However, in this preferred embodiment three transitions are chosen in order to ensure that the reference part of a servo track can be unambiguously recognized in all cases. In the case of two transitions, uncertainty may arise in given situations (for example in the situation shown in FIG. 2d) in the distinguishing of reference pulses and measuring pulses. Furthermore, it is a striking aspect of FIG. 2a, in connection with FIGS. 2b and 2c, how near the measuring pulses may be situated to each other: successive measuring pulses succeed each other without additional intervals. This is contrary to the measuring pulses of this kind in the device described in U.S. Pat. No. 3,812,533, in which FIG. 4 shows that intervals are always provided. Intervals of this kind have a width which approximately equals that of the measuring pulses themselves; this more or less explains the fact that in the arrangement in accordance with the present application, a space saving by a factor of two is realized in the length of the servo tracks.

FIG. 3a shows a step-wise variation of the measuring transitions in both longitudinal directions of the servo tracks. In this example, a group G1 consists of 16 tracks. The servo tracks SRT again comprise the parts RW, EW and MW which correspond to the parts shown in FIG. 2. The difference is obvious after track number 9 and starting with the track number 10, the step-wise staggering extends to the left instead of to the right. Moreover, it is ensured that the measuring transitions MW which are situated at the same distance from the reference transitions within the group are of unlike sign. This is the reason why the jump of the step at the measuring transition 10 amounts to two jump intervals instead of one. The same is again applicable to the transition to a next group: from track number 15 in group G1 to track number 0 in group G2. FIG. 3b and FIG. 3c show the implications of this arrangement for the read signals to be generated by the magnetic head. The reference pulses RP1 and RP2 and RP1' are the same as in the FIGS. 2b–2c. This is also applicable to the measuring pulses MP originating from the measuring transitions 0 to 9. The only difference consists in the polarity of the measuring pulses originating from the measuring transitions 10 to 15 inclusive. FIG. 3b shows the measuring pulses MP3 and MP4 in the situation where the magnetic head is present in the position HP3 (see FIG. 3a) above the measuring transitions of the servo tracks 3 and 4. FIG. 3c shows the measuring pulses MP13 and MP14 in the situation where the magnetic head is present in the position HP13 (see FIG. 3a) above the measuring transitions of the servo tracks 13 and 14. Due to this difference in polarity of the measuring pulses MP3 and MP4 and the measuring pulses MP13 and MP14, an unambiguous distinction can be made between the track 3 and the track 13, respectively. Even if only one measuring pulse is generated due to a slightly shifted position of the magnetic head (for example, compare measuring pulse MP2 of FIG. 2c), the polarity is decisive as regards the choice from the two possible track numbers (for example, a sole positive measuring pulse on the magnetic head position line which extends through MP3 and MP14 in FIGS. 3a–c indicates the position above the fourth servo track, while a negative pulse at this area indicates a position above the fourteenth servo track). As far as the additional transitions are concerned, see the pulses ERP1 and ERP2 which are of the same nature as those shown in FIG. 2.

Figure 4:
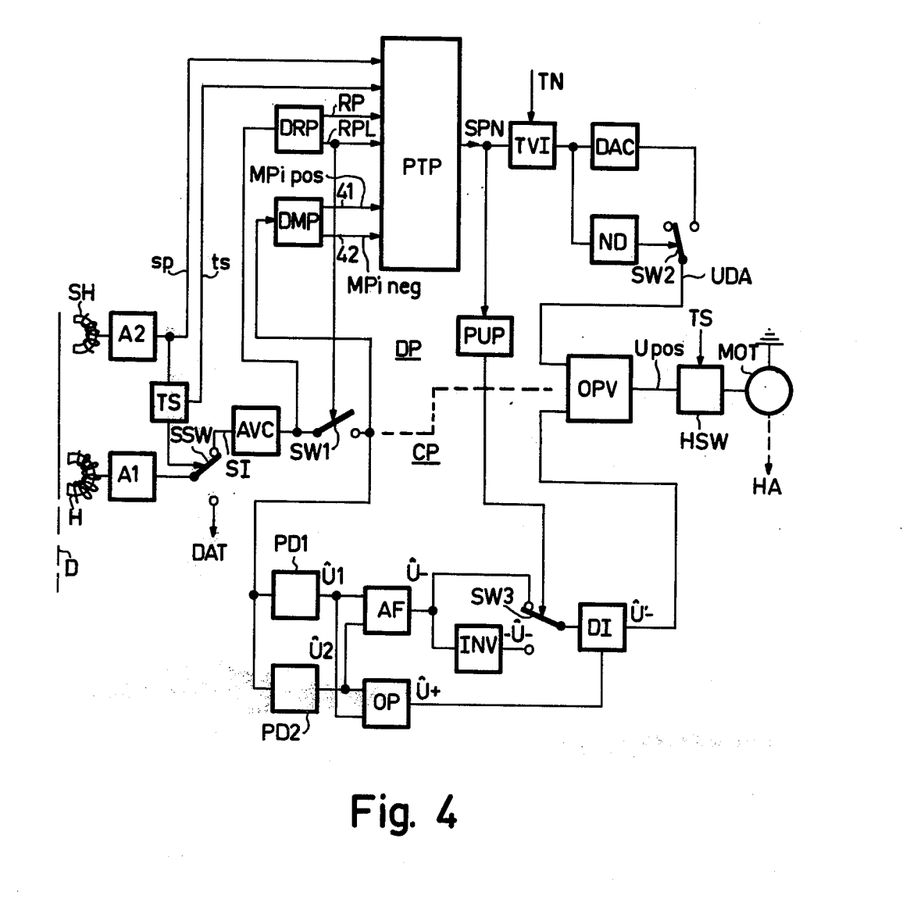
FIG. 4 shows an example of a block diagram of a device for processing the generated signals.
Figure 8:
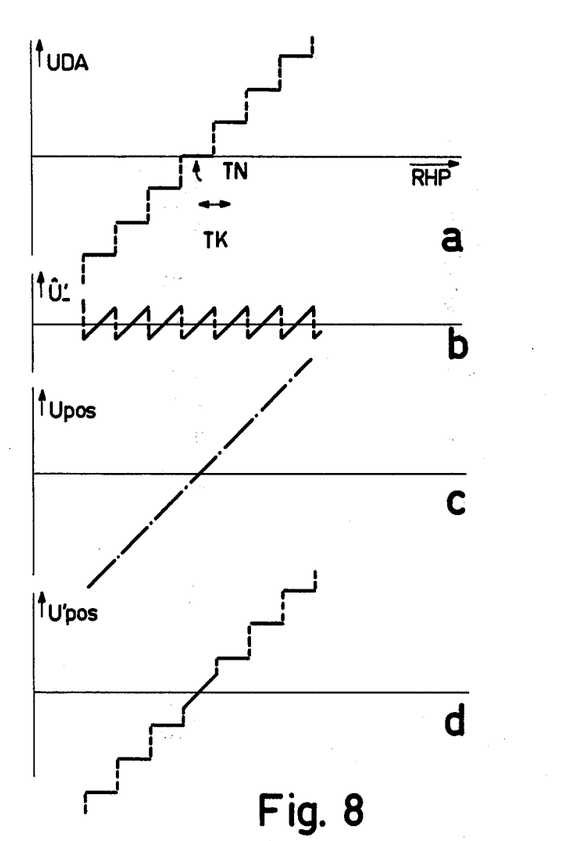
Figure 9:
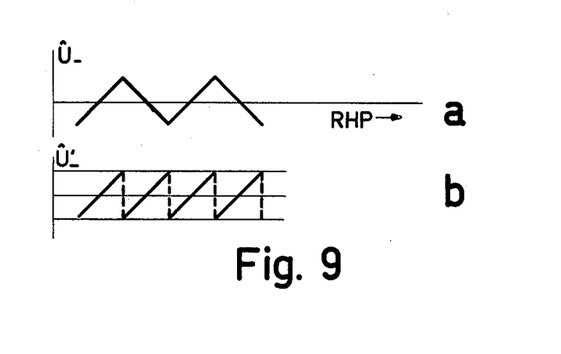

FIG. 4 shows a block diagram which serves to illustrate the functional procedure for signal processing, taken from the magnetic head, moving across the rotating disc in the radial direction, up to the position signal Upos which provides the ultimate fine control as the direct control signal. This description is also based on the diagrams shown in the FIGS. 5, 8 and 9. The block diagram comprises two partly separate sections: CP, being the amplitude control circuit, and DP, being the detection circuit. In the present embodiment, these circuits have the following function: DP detects and measures the time expiring between the reference pulses and the measuring pulses and, moreover, determines the polarity of the measuring pulses. Therefrom, the number SPN of the data track DT in the vicinity of the area where the head is situated is derived. CP first of all determines the amplitude of the measuring pulses and derives, from the difference therebetween, the exact position with respect to the data track determined in DP.

Figure 5:
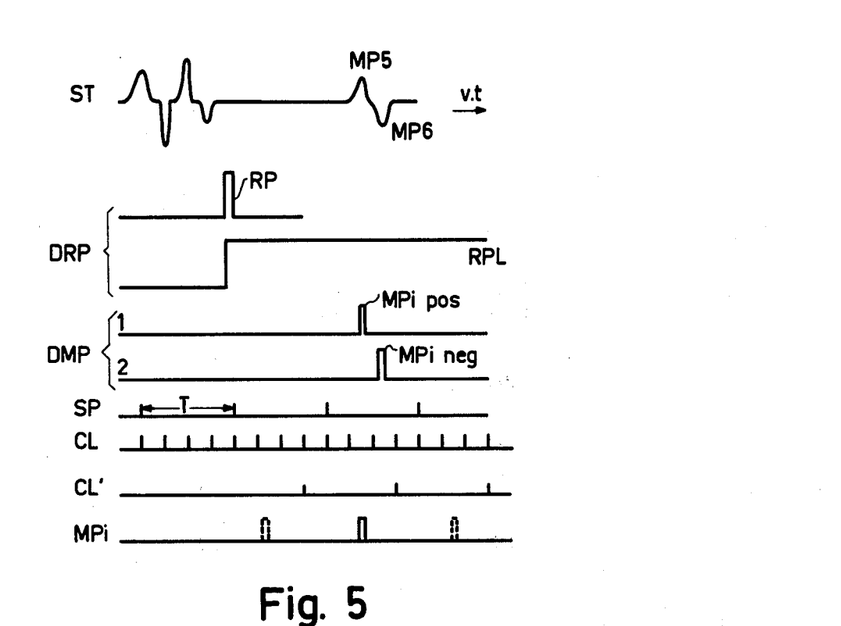
FIG. 5 shows a number of signal diagrams associated with the device shown in FIG. 4.

The reference H in FIG. 4 denotes the read/write magnetic head which comprises two coils. When the magentic disc D rotates, the passing magnetization changes are read and amplified in the form of electrical signals in an amplifier A1. The rigidly arranged synchronization track magnetic head SH detects the synchronization transitions of the disc which are amplified as electrical signals in the amplifier A2. A2 supplies synchronization pulses SP on the line sp. In this embodiment, these pulses are counted in known manner in a pulse counter TS and are compared with fixed counter positions. A given counter position indicates that a servo sector is entered, while an other counter position indicates that a data sector is entered, and so forth. This sector information is used in known manner to operate a sector switch SSW. Thus the data picked up by the head H are discriminated according to origin in data DAT or servo information SI. At the end of a servo sector, TS supplies a pulse "end of servo sector" over line ts. In an amplifier AVC, having feed-back automatic gain control, it is ensured that the positive as well as the negative pulse shapes are maintained and that, moreover, the amplitudes of the reference pulses remain the same. When a head follows, for example, an inner track, the amplitude of the signals is lower; the AVC then obtains a higher gain factor and a waveform as shown on the axis ST (see below) in FIG. 5 is then maintained on the output of the AVC.

The reference pulses are detected and recognized as such in a detector DRP. The foregoing is shown in FIG. 5; servo track information is shown on the axis ST. On the axes DRP it is indicated how a control reference pulse RP is derived from the reference pulses in DRP, a pulse RPL, having a length which corresponds to the duration of the presence of the magnetic head above the relevant servo sector, being derived from said control reference pulse RP. The pulse RPL is applied to a switch SW1 and to a position detection device PTP. Said pulse RP is also applied to PTP. The pulse RPL closes the switch SW1, so that further information arriving from the amplifier AVC is applied to a measuring pulse detection device DMP. This information concerns the measuring pulses MPi provided in the servo tracks at a given distance from the reference pulses. The two measuring pulses MPi, the measuring pulses MP5 and MP6 in accordance with the example of FIG. 5, are detected in the measuring pulse detection device DMP. As is shown on the axis DMP1, MP5 provides a "positive" measuring pulse MPipos, while MP6 provides a "negative" measuring pulse MPineg as shown on the axis DMP2. MPipos produces a pulse signal on the output 41 of DMP. The measuring pulse MPineg produces a pulse signal on the output 42 of DMP. These two pulses are applied to the position detection device PTP.

Figure 3:
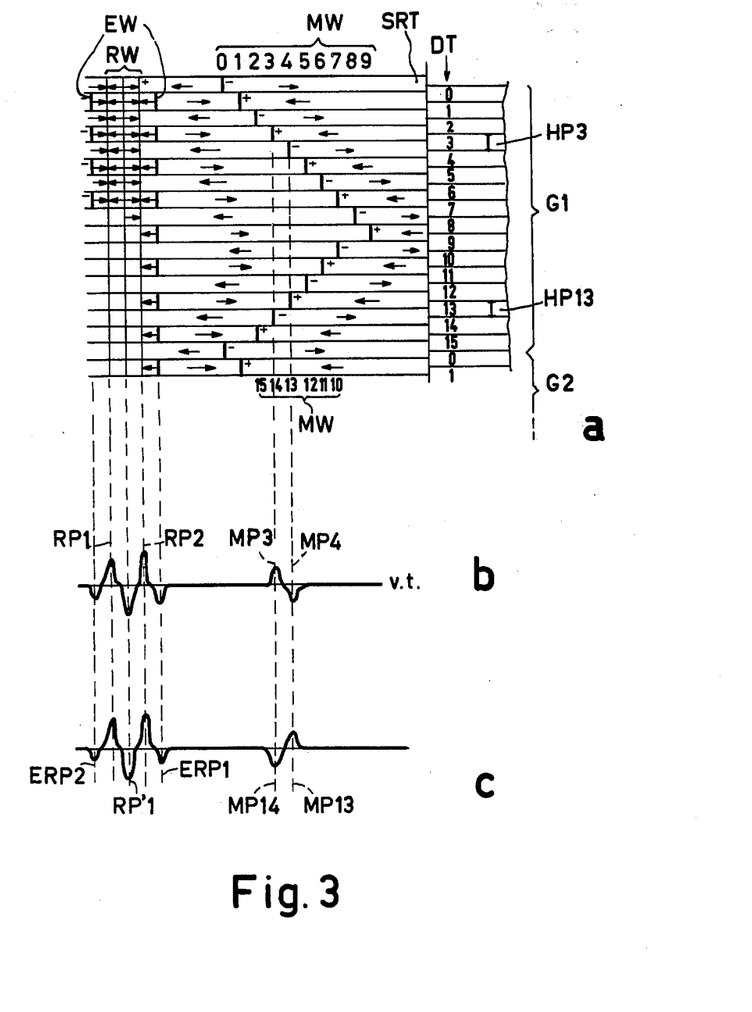
FIG. 3, consisting of a through c, shows a further example of such a magnetization pattern, again with associated diagrams.
Figure 6:
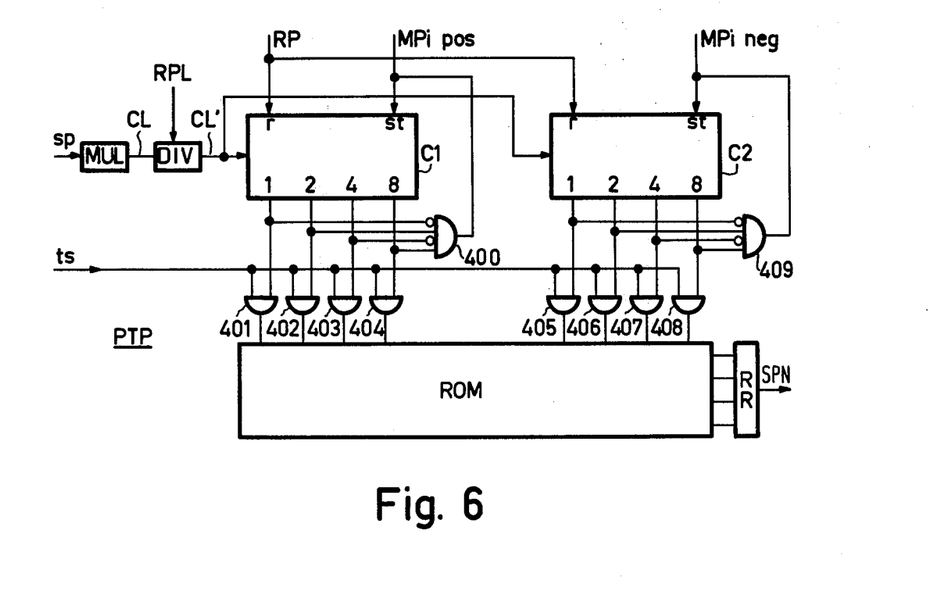
FIG. 6 shows a detailed diagram of a part of the device shown in FIG. 4.

FIG. 6 shows a feasible embodiment of a position detection device PTP, comprising a frequency multiplier MUL, a frequency divider DIV, two binary counters C1 and C2, a read-only memory (ROM) (or programmable read-only memory (PROM)), and an output register RR. FIG. 6 shows an embodiment which pertains to the case where use is made of the servo track lay-out as shown in FIG. 3. It is particularly important to consider the measuring pulses MPipos as well as MPineg. These measuring pulses are used to determine the data track number SPN in the vicinity of which is the head is situated. Assume that the synchronization signal SP, derived from the synchronization track SNS, has a pulse interval which equals the distance between two successive measuring pulses (assume this distance to be T), see FIG. 5, axis SP. Because pulses SP are generated by a head other than the one generating the measuring pulses (they may even originate from another disc), it is not possible to obtain a constant phase relationship between the signals originating from these two heads (SH, H, FIG. 1). In order to ensure that correct measurement of the location of the measuring pulses takes place with respect to the reference pulse RP, an additional step should be taken: the frequency of the synchronization pulses applied to PTP via the line sp is increased. The period duration is reduced to be an integer number of times shorter than the time expiring between two successive measuring pulses. In the multiplier MUL, multiplication by a factor of four takes place. The clock signal CL is then produced. Subsequently, after the signal RPL has become high, for which purpose it is applied to a divide-by-4 device DIV, the signal CL is divided (by four) in DIV and a clock signal CL' which has been shifted on the basis of RPL appears. In DRP (FIG. 4) it is ensured that RPL can become high only if it leads the first possible measuring pulse (MP1 of track 1) by about ⅜ T in this example. The result is that the clock pulses to be applied to the counters C1 and C2 are always at least ⅜ T removed from the nominal positions of the measuring pulses MPi. Incorrect counting of the measuring pulses is thus precluded. The binary 1, 2, 4, 8 values of the counters C1 and C2 are applied, through AND-function gates 401–404 and 405–408, respectively, to address inputs of the read-only memory ROM. The line ts, originating from TS (FIG. 4), is also connected to said AND-function gates. Thus, the counter position of C1 and C2 reached at the end of a servo sector can be applied to the address inputs of the ROM.

The operation of the device PTP shown in FIG. 6 is as follows. Each time the pulse RP appears, that is, before the pulse RPL starts the dividing device DIV, the counters C1 and C2 are set to the zero position (by their reset inputs which are denoted by the reference r).

After the appearance of RPL, the clock pulses CL' are applied as counting pulses to C1 as well as C2. Counting continues until a measuring pulse MPi appears on an input st of the counters. C1 stops in reaction to a pulse MPipos and C2 stops in reaction to a measuring pulse MPineg. If one of the two measuring pulses does not appear (see, for example, the situation shown in FIG. 2e), the relevant counter continues until, for example, a position 1010 (=10 decimal) is reached, after which it is reset to zero by the pulse RP, simultaneously with the other counter. The stopping of the counters C1 and C2 in the position 1010 (=10 decimal) is realized in this embodiment by means of a signal which is applied from an AND-function gate 400 or 409 to the relevant input st of the counters C1 and C2, respectively. The input signals of 400 and 409 originate from the counters and all carry a "1" signal when 1010 is indicated by the counter C1 or C2 (a dot means "inversion"). At the end of the servo sector within which the measuring pulses have been derived from a servo track, the "end of sector pulse" appears on the line ts and the counter positions reached on the counters C1 and C2 are thus applied as an address to the ROM. The contents of the ROM in the word locations designated by these addresses is such that the correct track number is read from the memory. This number SPN is stored in the output register RR and is then available for further processing.

Figure 7:
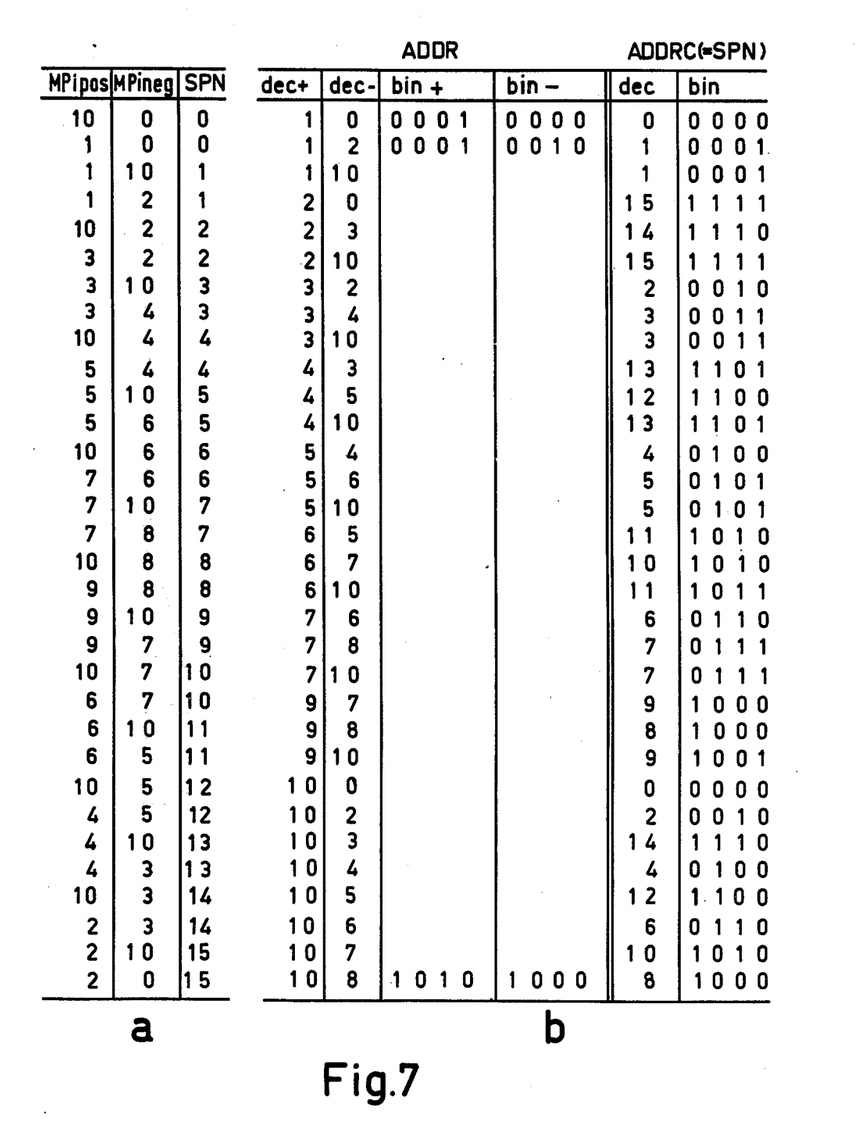
FIG. 7 shows tables a, b which constitute an eample of a data pattern in a memory as shown in FIG. 6.

FIG. 7 shows how the ROM, addressed from the counters C1 and C2, can be filled with the track number codes. It is to be noted that the coding of the track numbers from said counters can also be realized by means of a combinatory logic network. Such a set-up follows directly from the pattern of changes in the servo track and the associated track numbers. Because use is often made of read-only memory nowadays, such a memory is used, by way of example, to obtain the track number data.

Description of FIG. 7. As appears from FIG. 3, measuring pulses are present in only ten positions. These positions correspond to the counter positions 0, 1, ... 9, so that a 4-bit binary counter still has a number of free positions. The position 10 (binary 1010) can be used to indicate that the relevant positive or negative measuring pulse was not present (see above). Therefore, the counters stop in the position 1010 if stopping does not take place in reaction to a pulse MPipos or MPineg.

FIG. 7a shows a table of all pulse combinations which can possibly occur in the arrangement shown in FIG. 3. The position of appearance of a positive or negative measuring pulse is characterized by the relevant counting position (see the left columns in FIG. 7a). The associated track numbers SPN are shown in the right column of FIG. 7a.

FIG. 7b shows, in the sequence of the decimal digits of the column MPipos of FIG. 7a, the decimal values of the counter C1 in the first column (dec+). The second column contains the associated decimal values of the counter C2 (dec−). The addresses of the said ROM are thus determined (ADDR). The third and the fourth column (bin+, bin−) show the corresponding binary values of these addresses. Thus, each address has a length of 8 bits. The contents of the ROM at these addresses are stated in the columns ADDRC (=SPN) as a decimal (dec) and a binary (bin) number, respectively.

This table shows that only 32 of the 256 ($2^8$) possible addresses are used. The ROM, comprising these 256 addresses containing 4 bits (for the track number SPN) per address, then represents a 1024-bit ROM. When intermediate coding is used to make a 1-out-of-32 code of the 8-bit addresses of which only 32 are required, a $4 \times 32 = 128$-bit ROM also suffices.

Thus, when the track number is known, it is compared with the desired track number. This is realized in the device TVI (FIG. 4) in which the difference is determined between the measured track number from PTP and the desired track number of the relevant group which is externally applied to the input TN. In practice, TVI may be a 4-bit integrated adding circuit. The desired track TN is applied with each bit in inverted form. When a (1) is added via the carry input, a subtract operation takes place. The difference found is converted into a positive or negative track number difference signal UDA in a digital-to-analog converter DAC. If the difference equals zero, which means that the desired track has (almost) been reached, this is separately laid down by a zero detector ND. This detector operates a switch SW2 whereby the digital-to-analog converter DAC is uncoupled from the output. This is done to eliminate any offset of the DAC.

The appearance of the track number difference signal UDA obtained at various distances from the desired target track is as shown in FIG. 8a. Therein, RHP denotes the radial head position, TN denotes the target track, and TK denotes the track pitch.

The signal from the amplifier AVC is not only applied, by the switch SW1, to the detector section DP with DMP and PTP, but also to the position control section CP which primarily consists of peak detectors PD1 and PD2. In PD1, a voltage Û1 is generated which is a measure for the amplitude of a positive measuring pulse. Similarly, in PD2 a voltage Û2 is generated which is a measure for the amplitude of a negative measuring pulse. In the subtraction device AF, both peak voltages are subtracted, while in an adder OP both peak voltages are added. The adder/subtraction devices may be normal operational amplifiers. Voltages Û− = Û1 − Û2 and Û+ = Û1 + Û2 appear on the outputs of AF and OP, respectively. The voltage Û− constantly represents the position of the magnetic head with respect to the boundary between two successive servo tracks (or with respect to the center of a data track). This is separately shown in FIG. 9a. However, due to the forward and reverse changing of the slope of this signal, control cannot be realized thereby. In order to enable control, it is necessary to invert the voltage Û− every other track. This is realized in an operational amplifier INV (FIG. 4) which is connected as an inverter and in which −Û− is formed, after which this voltage replaces the voltage Û− for other track under the control of the switching of the switching device SW3. This results in the voltage Û′− shown in FIG. 9b. The switching of the switching device SW3 is controlled by an even/odd detector PUP which detects the even/odd state of the tracks on the basis of the track number information originating from PTP.

FIG. 4 also shows a divider DI in which the voltage Û− (and −Û−) is divided by the sum voltage Û+. This is because, normally speaking, the voltage Û+ is always constant (see, for example, the peaks of the measuring pulse signals in FIG. 2c and FIG. 2e), but due to abrupt variations of the floating height or layer thickness on the disc and other effects of brief duration which influence the signal strength, Û+ will not be completely constant (slow variations, however, have already been eliminated by the amplifier AVC). Similarly, $\hat{U}-$ is thus also additionally varied (in addition to its normal variations). These effects are compensated for by said division in DI, because in the case of a sudden signal reduction of say 10%, $\hat{U}+$ and $\hat{U}-$ (or $-\hat{U}-$) become 0.9 $\hat{U}+$ and 0.9 $\hat{U}-$ (or 0.9 $-\hat{U}-$). After division of 0.9 (or 0.9 $-\hat{U}-$) by 0.9 $\hat{U}+$, $\hat{U}-$ (or $-\hat{U}-$) is obtained again. The combination of $\hat{U}-$ and $-\hat{U}-$ (as shown in FIG. 9b) is denoted hereinafter by $\hat{U}'-$. The divider may be a customary, commercially available analog divider. Finally, FIG. 4 shows an operational amplifier OPV which is used as an adding amplifier and in which the difference signal $\hat{U}'-$ and the track number difference signal UDA from the digital-to-analog converter DAC are added to each other. As has already been stated, FIG. 8a shows the signal UDA. FIG. 8b again shows the difference voltage $\hat{U}'-$, while the adding result obtained in OPV is shown in FIG. 8c. This signal, denoted by Upos, has a special property in that it is linear over an entire group of tracks. This linear positioning signal is directly proportional to the distance between the magnetic head and the target track and enables proportional control to be performed within a complete group of tracks. The arm HA is displaced under the control of this signal U pos by means of a variable speed drive motor MOT. Finally, the output section of the control device includes a hold switch HSW whereby the position signal U pos can each time be held during the data sectors until the next servo sector. To this end, the hold switch HSW is controlled by the said pulse counter TS, which determines the difference between data sectors and servo sectors.

It is to be noted that for position control it is also possible to uncouple the peak detector signal $\hat{U}-$ (after subtraction device AF) when the digital-to-analog converter DAC inputs are not equal to zero. In this case, a position signal $\hat{U}$ pos as shown in FIG. 8d is obtained.

Figure 10:
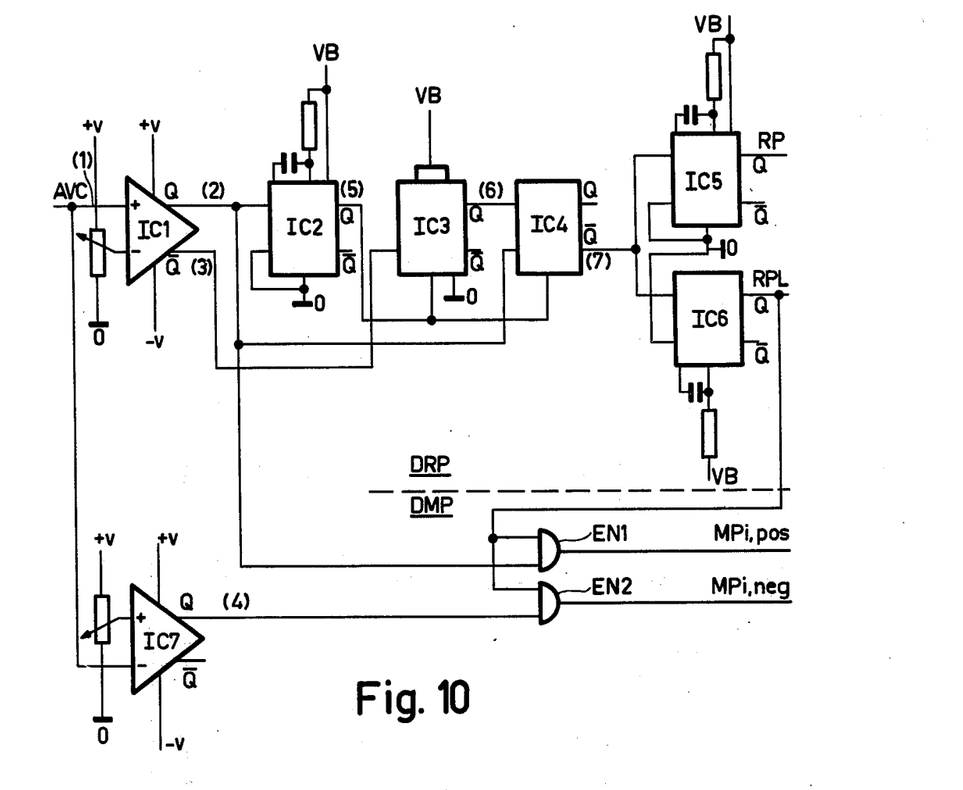
FIG. 10 shows a detailed diagram of a further part of the device shown in FIG. 4.
Figure 11:
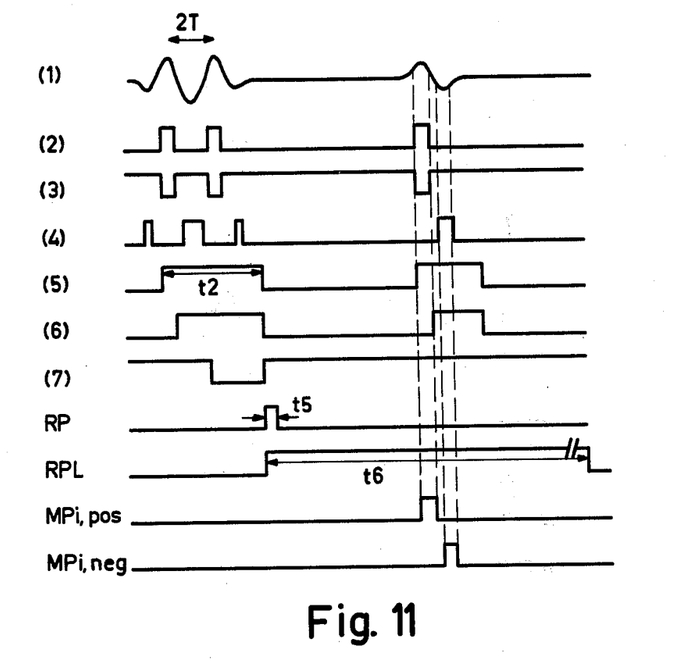
FIG. 11 shows a signal diagram associated with the detailed diagram of FIG. 10.

FIG. 10 shows a detailed diagram of the devices DRP and DMP of FIG. 4. Therein, IC1, IC7 denote comparators in which the input signals originating from AVC (FIG. 4) are compared with given voltage values $+V$, $-V$. The waveforms produced in this circuit are shown in FIG. 11. The digits stated between brackets (1), (2), and so forth, refer to the points of the circuit where a relevant waveform is present. The outputs of the separate sections of the circuit are denoted by the references Q and $\overline{Q}$, respectively. The comparactor IC1 is followed by a monostable multivibrator IC2, for which it is assumed in this example that t2>2T. The flipflops IC3 and IC4 are actuated from IC1 and IC2. The waveforms shown on the axes (6) and (7) of FIG. 11 are produced. IC5 and IC6 are further monostable multivibrators in which the pulse RP and the pulse RPL, respectively, are formed. In this example, $t5 \approx \frac{1}{2}T$ and t6 lasts approximately until the end of the servo sector. Furthermore, the comparator IC7, in which the waveform shown on the axis (4) of FIG. 11 arises, and the comparator IC1 are followed by two AND-function gates EN1 and EN2. In conjunction with the pulse RPL, the measuring pulses MPipos and MPineg are generated therein. This is again shown on the correspondingly denoted axes in FIG. 11.

Figure 12:
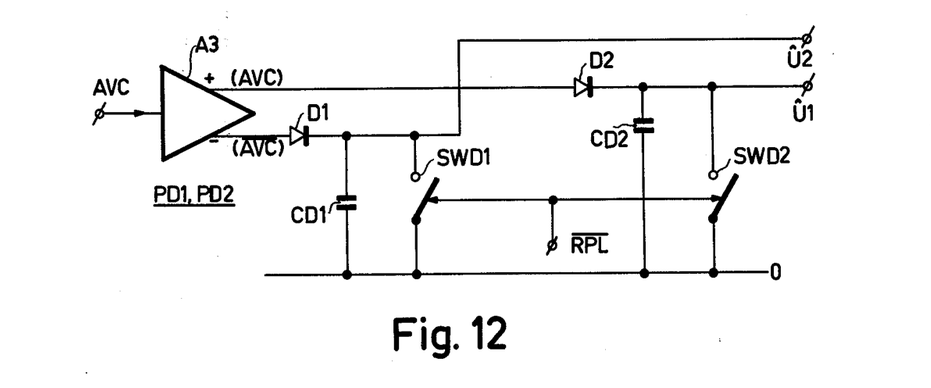
FIG. 12 shows a detailed circuit diagram of a further part of the device shown in FIG. 4.
Figure 13:
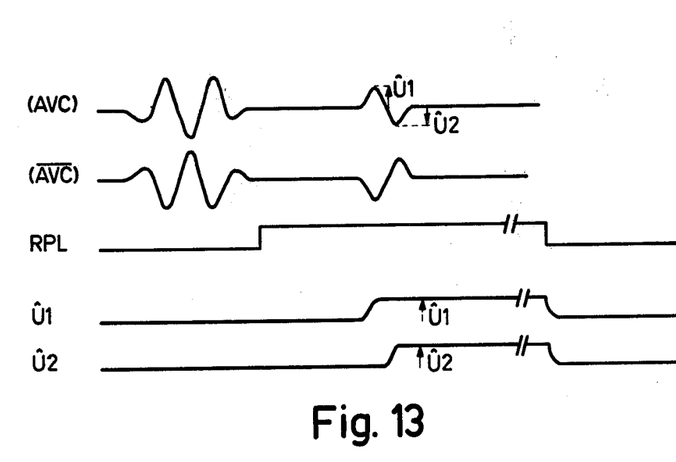
FIG. 13 shows a signal diagram associated with the detailed circuit diagram shown in FIG. 12.

FIG. 12 shows a circuit diagram used in the devices PD1 and PD2. FIG. 13 shows a number of diagrams concerning FIG. 12. The signal applied from AVC to PD1, PD2 by the switch SW1, is first amplified and inverted in an amplifier A3, so that on the outputs of A3, on the lines denoted by (AVC) and $(\overline{AVC})$, the waveforms shown on the correspondingly denoted axes in FIG. 13 (AVC) $(\overline{AVC})$ appear. The peak voltage $\hat{U}1$ and $\hat{U}2$ (see the corresponding diagrams of FIG. 13) are produced on the capacitors CD1 and CD2, respectively, by a combination of a diode D2 a capacitor CD2 and a switch SWD2, the switches being open for the duration of the said pulse RPL. During the absence of RPL (RPL), the switches SWD1 and SWD2 are reset, so that the capacitors are discharged again and prepared for a next peak voltage measurement.

What is claimed is:

1. A magnetic disc memory, comprising:
   means for positioning a magnetic head on a track,
   a disc sub-divided into sectors having groups of data tracks and sectors having groups of servo tracks in an alternating manner;
   said servo tracks defining the data tracks which are staggered over one half track pitch with respect thereto;
   each servo track containing magnetization changes serving as reference transitions for reference purposes;
   said servo sectors having for each group of servo tracks, stepwise magnetization changes serving as measuring transitions from track to track formed by magnetiation changes of alternating polarity for position detection purposes;
   said magnetization changes generating signals in said magnetic head;
   a detection circuit receiving said signals from said magnetic head, having first means for detecting positive and negative transitions of said stepwise magnetization changes of alternate polarity and having position detection means to generate information based upon said changes of alternate polarity information with respect to a track number reached in a group;
   said detection circuit having second means for detecting said reference transitions and an additional transition provided for every other servo track in the vicinity of said reference transitions;
   said detection circuit generating control reference pulses which are also supplied to the said means for generating information with respect to a track number reached in a group;
   an amplitude control circuit having means for providing the positioning of said magnetic head between two adjacent servo tracks.

2. A magnetic disc memory as claimed in claim 1, wherein for a group of servo tracks the measuring transitions are provided step-wise from track to track in a first part of the tracks in the one longitudinal direction and in the other longitudinal direction of the tracks in a second part of the tracks, the measuring transitions within the group which are situated at substantially the same distance from the reference transitions being of unlike polarity, so that the number of tracks within the group is substantially doubled, while the length of the servo tracks remains the same.

3. A magnetic disc memory as claimed in claim 2, wherein said detection circuit comprises:
   a measuring pulse detection device in which the position measuring pulses are derived, and the polarity of the measuring pulses is determined from the measuring transitions, a track number code being derived from the position measuring pulses in a position detection device under the control of said polarity of the measuring pulses.

4. A magnetic disc memory as claimed in claim 1, wherein after detection of the positive (U1) and negative (U2) peak voltage of the measuring pulses generated by the measuring transitions in the amplitude control circuit, said amplitude control circuit further includes:
an inverter in which the difference voltage (U−=U1−U2) is inverted, a switch being used to apply the voltage (U−) and the inverted voltage (−U−), respectively for every other track; a dividing device to receive said voltages and the sum voltage (U+=U1+U2), the difference voltage (U− or −U−) being divided by the sum voltage (U+) in said dividing device in order to eliminate abrupt variations in the amplitude of said measuring pulses.

5. A disc memory as claimed in claim 1, further including an adding amplifier having an input which receives a track number difference signal originating from said detection circuit formed in a digital-to-analog converter thereof, and also having a further input which receives a peak voltage difference signal originating from said amplitude control circuit, sums the said two signals to produce a control signal (U pos) which is linear over a group of tracks.

6. A magnetic disc memory as claimed in claim 1, wherein servo tracks are provided with at least two reference transitions, so that the reference signal generated by said magnetic head consists of at least two pulses.

7. A magnetic disc memory as claimed in claim 1, wherein said servo tracks are provided with three reference transitions, so that the reference signal generated by said magnetic head consists of at least two pulses of the same polarity, the tracks which include an additional transition being provided with a second additional transition.

8. A magnetic disc memory as claimed in claim 1, wherein said additional transition which is provided every other servo track in the vicinity of the reference transitions is situated between said reference transitions and said measuring transitions in such a servo track.

9. A magnetic disc memory as claimed in claim 7, wherein said additional transition and said second additional transition are provided on either side in the vicinity of said reference transitions.

10. A magnetic disc memory a claimed in claim 1 further comprising:
a magnetic disc provided with said reference transitions and said measuring transitions for use in said magnetic disc memory.

* * * * *